United States Patent [19]
Clendenin, Jr.

[11] Patent Number: 5,941,565
[45] Date of Patent: Aug. 24, 1999

[54] VEHICLE TRACTION ENHANCING APPARATUS

[76] Inventor: J. Gregg Clendenin, Jr., 300 Delaney Woods, Nicholasville, Ky. 40356

[21] Appl. No.: 08/724,384

[22] Filed: Oct. 1, 1996

[51] Int. Cl.⁶ .................................................. B60B 39/00
[52] U.S. Cl. ........................ 280/759; 224/403; 280/757; 296/3
[58] Field of Search ..................................... 280/757, 758, 280/759; 224/402, 403, 404, 405; 296/3 XC; 5/200.1, 201

[56] References Cited

U.S. PATENT DOCUMENTS

| | | |
|---|---|---|
| 4,190,281 | 2/1980 | Chandler . |
| 4,215,898 | 8/1980 | Ulics . |
| 4,343,578 | 8/1982 | Barnes . |
| 4,482,169 | 11/1984 | Yim . |
| 4,717,298 | 1/1988 | Bott . |
| 4,902,038 | 2/1990 | Grover . |
| 5,172,953 | 12/1992 | Chamberlain . |
| 5,259,712 | 11/1993 | Wayne . |
| 5,330,227 | 7/1994 | Anderson . |
| 5,494,315 | 2/1996 | Heltenburg ............................. 280/759 |
| 5,603,439 | 2/1997 | Pineda .................................... 224/403 |
| 5,657,916 | 8/1997 | Tackett ................................... 224/404 |

*Primary Examiner*—Eric Culbreth
*Attorney, Agent, or Firm*—King and Schickli

[57] ABSTRACT

A vehicle traction enhancing apparatus is provided having a rectangular base designed to fit between the wheel wells of a vehicle cargo area with extensions in juxtaposition with the front and rear faces of the wheel wells. The base is constructed of four restraint members welded together and sized to hold an array of concrete/cinder blocks over the rear axle of the vehicle. A removable rack fits into sockets, and supports construction sheets, such as wall board, plywood, ladders, lumber or the like. An auxiliary holder for round containers may be attached to the base or an extension member.

6 Claims, 2 Drawing Sheets

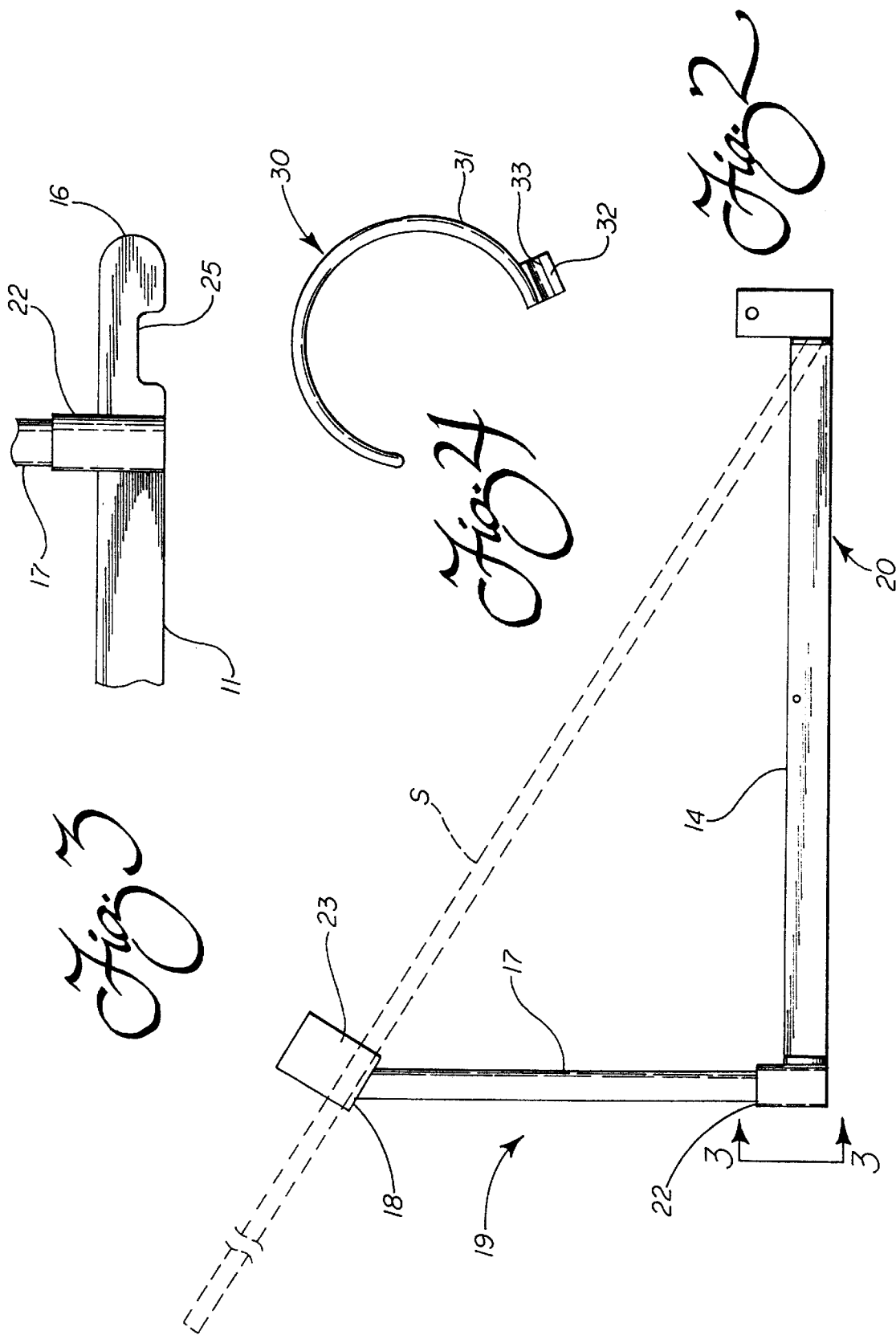

VEHICLE TRACTION ENHANCING APPARATUS

TECHNICAL FIELD

The present invention relates generally to a vehicle traction enhancing apparatus; and more particularly, to an improved traction enhancing apparatus designed to secure ballast weight between the wheel wells of a cargo area.

BACKGROUND OF THE INVENTION

Insufficient rear wheel traction is a well known restriction inherent in the fundamental design of many cargo hauling vehicles including standard, as well as compact pick-up trucks. This is due to the inherent relative light weight of the cargo area when unloaded since this area encompasses the area directly over the driving rear axle. Without the benefit of loaded cargo, the weight over the rear axle of the vehicle is simply insufficient to provide adequate traction for the rear wheels. This restriction or shortcoming in the design of the vehicles results from the consumer's desire, indeed demand, to have a standard size, light weight vehicle that is economical to drive during periods in which it is unloaded. At the same time, access to the full length and width of the cargo area is demanded when there is a full pay load to be hauled. The need for adequate traction when the cargo area is unloaded is of increased importance during inclement weather, such as in rainy, snowy, or icy conditions; i.e. traction problems are especially prevalent when the road surface is slippery.

To overcome this restriction, many vehicle owners simply add ballast weight in the cargo area of the vehicle in an effort to improve rear wheel traction. Typically, this additional weight takes the form of randomly placed cargo, such as sandbags, concrete blocks, firewood, snow or any other readily available items.

Although this self help method is simple to implement and inexpensive, it is also inefficient and possibly damaging to the vehicle. This random placement of the cargo is most often simply either stacked against the tail end of the cargo area, or against the front of the cargo area adjacent the cab. Further, simply placing the added cargo in the middle of the cargo area allows it to be free to slide to one of these locations during braking or acceleration. This is not only very annoying to the occupants of the vehicle, but also can result in substantial damage to the cargo area. As will be realized, having the ballast cargo in either of these locations does help to then restrain its longitudinal movement in at least one direction, but in terms of assisting in increasing the traction, it is very inefficient. Since the cargo is not directly over the rear axle, only a portion of the desired additional weight is transferred to the rear axle.

In response to this operational restriction of cargo hauling vehicles, and the inadequacy of this most popular self help method for improving traction, several designs for ballast cargo restraining or securing devices have been attempted. While these designs are a move in the right direction, they fall short when it comes to securing the ballast cargo against sliding in all directions in the cargo area. Also, there is a need for a new design of a traction enhancing device of this type, that is not only capable in restraining the cargo in all directions, but is easier and more convenient to install and remove, is low in cost and adaptable for use with auxiliary pay load cargo holders.

One prior art traction enhancer design is disclosed in U.S. Pat. No. 4,482,169 to Yim, which includes two transverse supports sized for placement on the bed of a truck between the wheel wells. Lead weights are bolted to the supports to form a rectangular assembly. In one embodiment, wooden extensions are extended beyond the space between the wheel wells. The extensions contact either the front or the back side of the wheel well to prevent movement of the assembly in only one direction.

This type of traction enhancer assembly has several disadvantages. First, assembling the transverse supports and lead weights to form the rack assembly is a difficult and cumbersome process. The transverse supports are preferably bolted to six one-hundred pound lead ingots, which are not only hard to find but are very expensive. Once configured for use, the weight of the assembly makes the rack difficult to manipulate. During installation and removal, the use of a forklift is required.

Further, the assembly is not entirely secure and therefore not efficient during use. The wooden extensions on the transverse supports are located on only the front side or the back side of the wheel wells. This configuration allows the rack assembly to move away from the most efficient position directly over the rear axle during use. This movement is also likely to cause damage to the bed of the truck.

Another traction enhancing system is disclosed in U.S. Pat. No. 4,902,038 to Grover. A system of interlocking rectangular cast iron plates are positioned on the bed of a truck in a manner which allows for the normal use of the truck bed. This system of interlocking plates is intended to provide additional weight to improve traction.

While this type of prior art system provides the advantage of allowing substantially the full use of the bed of the truck for transporting cargo, the system is also high in cost and not easy to install or remove. Also, the added weight is dispersed throughout the truck bed and not focused directly over the rear axle in the most efficient manner.

Thus, there is a need identified for a vehicle traction enhancing apparatus that provides ballast weight on the cargo area over the rear axle that is efficient in restraining the weight directly over the rear axle, and that is easy to use and low in cost.

SUMMARY OF THE INVENTION

It is accordingly a primary object of the present invention to provide a vehicle traction enhancing apparatus that is not subject to the shortcomings of the prior art.

It is an important object of the present invention to provide a vehicle traction enhancing apparatus wherein the apparatus is maintained in a secure position between the wheel wells.

It is another object of the present invention to provide a vehicle traction enhancing apparatus which is readily removable and easy to store when not in use.

It is yet another object of the present invention to provide a vehicle traction enhancing apparatus designed to hold ordinary, relatively low cost cement/cinder building blocks or the like.

It is still another object of the present invention to provide a vehicle traction enhancing apparatus made of materials which are durable, and which require no additional parts or tools to install.

It is another object of the present invention to provide a vehicle traction enhancing apparatus which is adapted for use of auxiliary cargo holders, such as for transporting standard 4'×8' construction sheets, such as wall board and plywood, as well as round containers of various sizes.

Additional objects, advantages, and other novel features of the invention will be set forth in part in the description that follows and in part will become apparent to those skilled in the art of the invention. The objects and advantages of the invention may be realized and attained by means of the instrumentalities and combinations particularly pointed out in the appended claims.

To achieve the foregoing and other objectives, and in accordance with the purposes of the present invention as described herein, a novel and improved vehicle traction enhancing apparatus is provided for securing ballast or additional weight in the cargo area of a vehicle. The apparatus includes a generally rectangular base designed to fit between the wheel wells of a vehicle and to hold the ballast weight against sliding in any direction. Extensions attached to the base maintain its position between the wheel wells and directly over the rear axle, thereby efficiently maximizing the effect of the additional weight.

More specifically, the generally rectangular base is made from angle members; two transverse restraint members and two longitudinally extending side members. The base is designed and sized to hold an array of ordinary building (cement/cinder) blocks or the like in close rows and columns. The extensions incorporate handles to make installation and removal of the base very easy. Also, the blocks are easy to lift one at a time during installation/removal.

Preferably, the traction enhancing apparatus includes a removable inverted U-shaped support rack, which is attached to the rear transverse or cross member of the base. This allows standard construction sheets of wall board, plywood, ladders and the like to be transported while freeing the remaining area in the cargo area for other pay load supplies. Additionally, the support positions this load so that its center of gravity is generally within the desired range over the rear axle.

Another auxiliary cargo holder of the invention comprises a detachable curved rod and clamp assembly, which can be utilized to secure round drums, coolers, buckets and the like.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is an elevational side view of the vehicle traction enhancing apparatus with the support rack secured for transporting sheet(s) of wall board or the like;

FIG. 3 is an enlarged elevational view taken in the direction of line 3—3 of FIG. 2 showing one extension, and a socket for the auxiliary support rack; and FIG. 4 is a bottom view of the auxiliary holder for a container.

Figure 1:
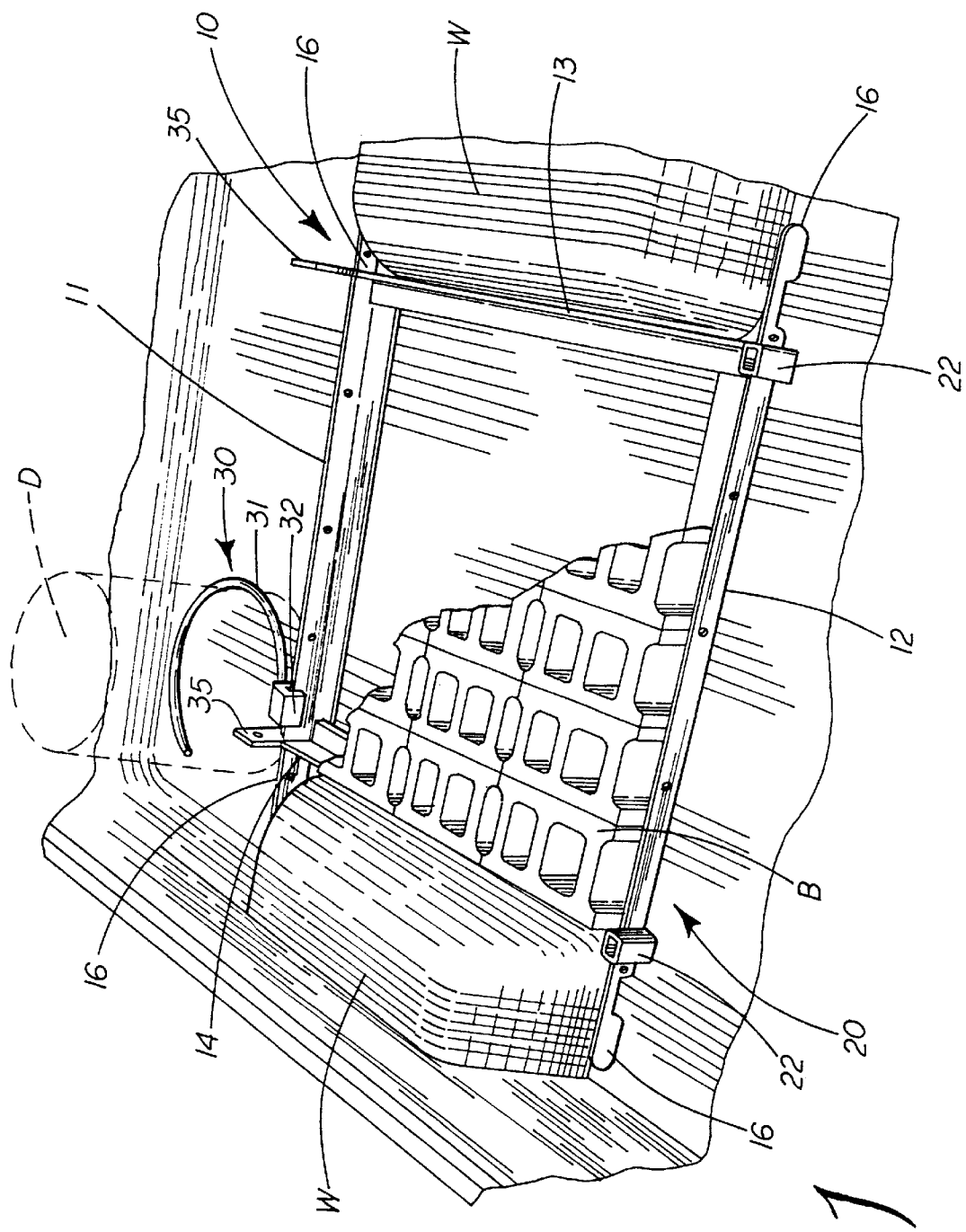
FIG. 1 is a rear perspective view of the vehicle traction enhancing apparatus secured in place between the wheel wells of the cargo area of a vehicle and illustrating blocks in position as the ballast weight (cutaway for clarity), and an auxiliary curved rod holder.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 of the drawings illustrating the preferred embodiment of an improved vehicle traction enhancing apparatus according to the present invention, and generally represented by the reference number 10. The traction enhancing apparatus 10 is particularly adapted for easy installation and removal. The apparatus secures ballast weight, such as an array of concrete building blocks B, directly over the rear axle in an efficient manner.

In the preferred embodiment, the traction enhancing apparatus 10 is fabricated of angle steel and comprises two transverse or cross restraint members 11 and 12 and two side restraint members 13 and 14 including four extensions 16 at the ends. The transverse members 11 and 12 and the side members 13 and 14 are preferably welded together to form a base, generally represented by the reference number 20. The extensions 16 are advantageously placed in juxtaposition to the front and rear faces of wheel wells W. This arrangement advantageously secures the traction enhancing apparatus 10 in the space between the wheel wells W preventing any significant sliding movement of the ballast cargo; such as the array of blocks B. One standard size of the base 20 is 37 inches in the longitudinal direction and 49 inches across. Thus, one selection of an array of standard 8"×16" blocks B as ballast weight can be arranged 3 blocks deep and 6 blocks across, as shown in FIG. 1.

As shown in FIG. 2, a removable inverted U-shaped rack 19 comprises a crossbar 18 mounted on two uprights 17 (only one shown in FIG. 2). The uprights 17 are welded to the crossbar 18. The angle of the upper support surface is such that one end of a construction sheet S rests securely in the raised position shown, with the crossbar thus providing a coplanar support surface. The crossbar 18 is made of an elongated metal plate and formed into a U-shape having fins 23 at each end. The fins 23 prevent any sidewise movement of the load.

The support rack 19 is removably attached to the base 20 by sockets 22, which are welded to the outside surface of the rear transverse support member 11 at each end (see FIG. 1). The uprights 17 are held in place by simply sliding them into the sockets 22. This form of connection allows the rack 19 to be easily removed and stored when not in use.

As shown in FIG. 3, the extensions 16 include notches 25 to form handles that are easy to grasp during installation and removal.

As best shown in FIG. 1, an auxiliary holder 30 is provided for restraining a round container, such as a drum D. The holder 30 comprises a curved rod 31 attached to a mounting clamp or clip 32. As best shown in the bottom view of FIG. 4, the clamp 32 includes a slot 33 that is adapted to fit over, and thus securely grasp the upright leg of the cross members 11 or 12 or the extension members 16. In this manner, the drum D, or any other container, is advantageously secured against sliding in the cargo area of the vehicle.

A pair of tabs 35 may be attached to the front of the base 20 or holes may be drilled in the upright leg of the cross or side members 11, 12 or 13, 14 or an extension member 16 to provide attachment points for hold-down ropes or bungee cords, if desired.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the base 20, the rack 19, and the extensions 16 can each be made of other materials, including a durable plastic material, such as extruded high density polyethylene. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitable entitled.

I claim:

1. A vehicle traction enhancing apparatus for securing additional weight in a cargo area that includes wheel wells, comprising:

first and second transverse restraint members;

first and second side restraint members;

said first and second side members fixedly supported relative said first and second transverse members to form a substantially rectangular base to substantially define an open space between the wheel wells;

extension members fixedly supported to the ends of the transverse members and adapted to fit in juxtaposition with the front and rear faces of the adjacent wheel well; and an array of ballast weights positioned within said base;

whereby enhanced traction by increased weight is provided while assuring restraint against movement of the weights in the cargo area.

2. The vehicle traction enhancing apparatus of claim 1, wherein said transverse restraint members and said side restraint members are fabricated of angle steel and are welded together to form said substantially rectangular base.

3. The vehicle traction enhancing apparatus of claim 1, wherein the array of weights comprise building blocks.

4. The vehicle traction enhancing apparatus of claim 1, further comprising:

an inverted U-shaped rack having first and second upright supports and a cross member fixedly supported thereby and adapted to support a construction sheet at an angle to said bed.

5. The vehicle traction enhancing apparatus of claim 4, wherein said cross member is substantially flat and supported at an angle to said bed to mate with said sheet.

6. The vehicle traction enhancing apparatus of claim 1, further comprising:

an auxiliary holder including a curved rod adapted to receive a round container; and attachment means on said rod to clamp said rod to one of said transverse members of said base.

* * * * *